United States Patent Office
3,449,349
Patented June 10, 1969

3,449,349
CERTAIN 4-[2,3, OR 4-PYRIDYL]-PHENYLACETIC ACID AND DERIVATIVES THEREOF
Tsung-Ying Shen, Westfield, and Alexander Matzuk, Colonia, N.J., assignors to Merck & Co., Inc., Rahway, N.J., a corporation of New Jersey
No Drawing. Continuation-in-part of application Ser. No. 414,428, Nov. 27, 1964. This application Feb. 28, 1968, Ser. No. 708,781
Int. Cl. C07d *31/34;* A61k *27/00*
U.S. Cl. 260—295                         4 Claims

ABSTRACT OF THE DISCLOSURE

This invention relates to para-pyridyl and substituted-pyridyl phenylacetic acids, alcohols, aldehydes, and derivatives thereof. These compounds have anti-inflammatory activity. The invention also relates to intermediates used in the preparation of the pyridyl phenylacetic acids, alcohols, aldehydes, and derivatives thereof.

---

This application is a continuation-in-part of co-pending application Ser. No. 414,428, which latter case was filed in the United States on Nov. 27, 1964, now abandoned.

This invention relates to new phenylacetic acids, alcohols, and to derivatives and intermediates thereof, and to a process for preparing the same. More specifically, this invention relates to p-heterocyclic phenylacetic acids and the esters and amides thereof, as well as to the corresponding alcohols, ethers, aldehydes, acetals, and non-toxic salts thereof. Still more specifically, this invention relates to "para" substituted pyridyl phenylacetic acids, alcohols, aldehydes and derivatives thereof. Still more specifically also, this invention relates to compounds of the following general formulae:

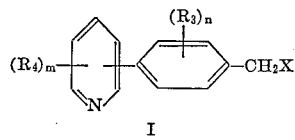

I

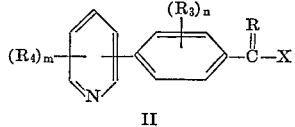

II and

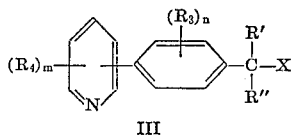

III wherein

R is methylene, ethylidene, or forms with the α-carbon a cyclopropyl group;

R' is lower alkyl, lower alkenyl, lower alkynyl, halo-loweralkyl, trihalomethyl or lower alkoxy;

R" is hydrogen or may be a lower alkyl or hydrogen when R' is a lower alkyl;

$R_3$ and $R_4$ may be hydrogen, lower alkyl (such as methyl, ethyl, propyl, butyl, and the like), halogen, trihalomethyl, lower alkylthio, mercapto, amino, di(lower alkyl) amino (such as dimethylamino, dipropylamino, ethylmethylamino, ethylbutylamino, and the like), cyano, nitro, carboxamido, di(lower alkyl carbamyl, lower alkanoylamino, lower alkylsulfonyl, di (lower alkyl) sulfamyl (such as dimethylsulfamyl, dipropylsulfamyl, methylpropylsulfamyl, ethylbutylsulfamyl, and the like), phenyl, trifluoroacetyl, acetyl or trifluoromethylthio;

n and m are each a number less than three; and

X may be COOH; COOR''', where R''' may be lower alkyl, lower alkenyl (such as prop-2-en, but-3-en, and the like), lower alkynyl (such as prop-2-yn, pent-3-yn), cyclo lower alkyl (such as cyclopropyl, cyclobutyl, cyclopentyl, and the like), phenyl, lower alkanoylaminophenyl, carboxyphenyl, carboxamidophenyl, lower alkoxy lower alkyl (such as methoxymethyl, ethoxymethyl, methoxyethyl, ethoxyethyl, and the like), poly lower alkoxy lower alkyl (such as dimethoxypropyl, diethoxypropyl, and the like), poly hydroxy lower alkyl (such as 1-4-dihydroxybutyl, 2,3-dihydroxypropyl, and the like, di(lower alkyl)amino lower alkyl (such as dimethylaminoethyl, diethylaminoethyl, diethylaminobutyl, and the like); $CONH_2$;

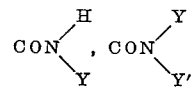

where Y may be lower alkyl, hydroxy lower alkyl (such as hydroxyethyl, 3-hydroxypropyl, 3-hydroxybutyl, and the like), poly hydroxy lower alkyl (such as dihydroxypropyl, dihydroxypentyl, and the like), phenyl lower alkyl (such as phenylethyl, phenylpropyl, phenylbutyl, and the like), phenyl, lower alkoxyphenyl (such as methoxyphenyl, ethoxyphenyl, propoxyphenyl, and the like), halogenophenyl (such as chlorophenyl, fluorophenyl, and the like), trifluoromethylphenyl, cyclohexyl, carboxymethyl, 1-carboxyl-3-carbamylpropyl, N-di-lower alkyl carboxamidomethyl (such as N,N-dimethylcarboxamidomethyl, N,N - dipropylcarboxamidomethyl, N,N - diethylbutylcarboxamidomethyl, and the like), N,N-di-lower alkylamino lower alkyl (such as dimethylaminoethyl, dipropylaminoethyl, ethylbutylaminoethyl, and the like), N-lower alkyl pyrrolidyl (such as N-methyl-3-pyrrolidyl, N-ethyl-3-pyrrolidyl, and the like), N-lower alkyl pyrrolidyl lower alkyl (such as N-ethyl-2-pyrrolidylmethyl, N-methyl-3-pyrrolidylmethyl, and the like), or Y may form a heterocyclic group with the nitrogen when Y is the group
—$CH_2$—$CH_2$—O—$CH_2$—$CH_2$,

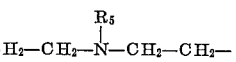

in which $R_5$ is lower alkyl (such as methyl, ethyl, propyl, butyl, and the like,

—$CH_2$—$CH_2$—NH—$CH_2$—$CH_2$—, —$CH_2$—$CH_2$—N—$CH_2$—$CH_2$—

—$CH_2$—$CH_2$—$CH_2$—$CH_2$—, —$CH_2$—$CH_2$—N—$CH_2$—$CH_2$—
$\quad\quad\quad\quad\quad\quad\quad\quad\quad\quad\quad\quad\quad\quad\quad\quad\quad$ |
$\quad\quad\quad\quad\quad\quad\quad\quad\quad\quad\quad\quad\quad\quad\quad\quad\quad$ $CH_2$—$CH_2OH$ and

—$CH_2$—$CH_2$—$CH_2$—$CH_2$—$CH_2$—

$CH_2OH$; $CH_2OR_6$, where $R_6$ is alkyl (such as ethyl, propyl, butyl, pentyl, and the like); CHO; $CH(OR_7)_2$, where $R_7$ is alkyl (such as ethyl, propyl, butyl, pentyl, and the like); and the pharmaceutically non-toxic salts of the acid. These salts may be the ammonium, alkali and alkali earth, amine, magnesium, aluminum iron salts and the like.

In the preferred compounds of this invention, X is COOH, $R_3$ is in a position meta to the acid side chain and may be a group such as halogen (chloro and fluoro), trifluoromethyl, lower alkoxy (methoxy, ethoxy, propoxy, butoxy, and the like), and lower alkylthio (methylthio, propylthio, pentylthio, and the like), especially halogen or trifluoromethyl.

Also in the preferred compounds of this invention, the para position of the phenylacetic moiety is attached to the 2- or 4-position of the pyridyl radical and $R_4$, attached to the 3-, 5- or 6-position of the pyridyl radical, is a hydrogen, halogen (chloro, fluoro), trifluoromethyl, lower alkoxy (methoxy, ethoxy, propoxy, pentoxy, and the like), loweralkylthio (methylthio, propylthio, pentylthio, and the like), especially halogen or trifluoromethyl.

Finally, in the preferred compounds of this invention, both $n$ and $m$ together are equal to two, each being one, or one of $n$ or $m$ being two.

The intermediate compounds of this invention have the following general formulae:

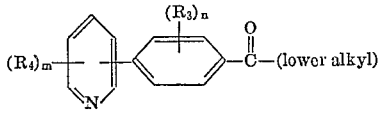

and

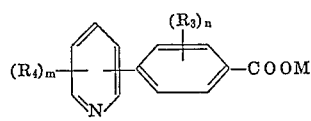

wherein

M may be hydrogen or lower alkyl; and
$R_3$, $R_4$, $n$ and $m$ are as previously defined.

The preferred compounds of these intermediates correspond to the above-described preferred final products of this invention.

We have found that the compounds described above have anti-inflammatory activity and are effective in the prevention and inhibition of edema and granuloma tissue formation.

The compounds of the instant invention can be used to treat inflammation by reducing inflammation and relieving pain in such diseases as rheumatoid arthritis, osteoarthritis, gout, infectious arthritis and rheumatic fever. The compounds described above also have antipyretic and analgesic activity and would be administered and used in the same manner and in the same dosage ranges as if they were being used to treat inflammation, as discussed further on.

The treatment of inflammation is accomplished by orally administering to patients a composition of the above-described compounds, particularly the preferred compounds, in a non-toxic, pharmaceutically acceptable carrier, preferably in tablet or capsule form. The non-toxic pharmaceutical carrier may be, for example, either a solid or a liquid. Examplary of solid carriers are lactose, corn starch, gelatin, talc, sterotix, stearic acid, magnesium stearate, terra alba, sucrose, agar, pectin, cab-o-sil and acacia. Examplary of liquid carriers are penut oil, olive oil, sesame oil and water. Similarly, the carrier or diluent may include a time delay material such as glyceryl monostearate or glyceryl distearate alone, or with a wax.

Several pharmaceutical forms of the therapeutically useful compositions can be used. For example, if a solid carrier is used, the compositions may take the form of tablets, capsules, powders, troches or lozenges, prepared by standard pharmaceutical techniques. If a liquid carrier is used, the preparation may be in the form of a soft gelatin capsule, a syrup or a liquid suspension.

The above-described compounds, particularly the preferred compounds, being useful in treating inflammation, that is in reducing inflammation, are advantageously administered internally to a patient (animal or human), admixed with a non-toxic pharmaceutical carrier such as exemplified above. The above-described compounds, and particularly the preferred compounds, will be present in an amount of from 1 mg. to 140 mg./kg. body weight per day, preferably from about 2 mg. to about 70 mg. per kilogram body weight per day, and especially from 4 mg. to 10 mg./kg. body weight per day. The most rapid and effective anti-inflammatory effect is obtained from oral administration of a daily dosage of from about 4 to 10 mg./kg. per day. It should be understood, however, that although preferred dosage ranges are given, the dose level for any particular patient depends upon the activity of the specific compound employed. Also, many other factors that modify the actions of drugs will be taken into account by those skilled in the art in the therapeutic use of medicinal agents, particularly the compounds described above, for example, age, body weight, sex, time of administration, route of administration, rate of excretion, drug combination, reaction sensitivities and severity of the particular disease.

The test method by which anti-inflammatory activity is determined is by the ability of the compounds described above to inhibit the edema induced by injection of an inflammatory (phlogistic) agent into the tissue of the foot of the rat. Groups of six male rats (Sprague, Dawley strain, 150±15 g.) each are given orally the compounds to be tested one hour before 0.1 ml. of 1% suspension of carragenin is injected into the plantar surface of the right hind paw. Immediately, and again three hours later, the foot volume is measured by its placement of mercury and recorded automatically. The difference between the immersion and final volumes is a measurement of the edema produced. The compounds tested were suspended or dissolved in 0.5% Methocel, whereas controls received only the Methocel. A usual test of 30 mg./kg. and one repetition plus one dose of 90 mg./kg. were usually given.

The above test method is known to correlate with anti-inflammatory activity in humans and is a standard test used to determine anti-inflammatory activity. This correlation is shown by compounds known to be clinically active, including indocin, aspirin, butazolidin, tandearil, cortone, hydrocortone and decadron.

The compounds of this invention may be prepared from the following starting materials: heterocyclic benzoic acids

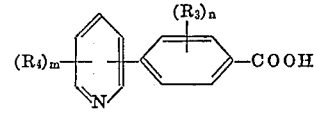

used for the preparation of the compounds of Formula I; and heterocyclic phenyl ketones

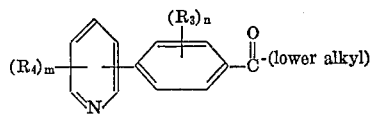

used for the preparation of the compounds of Formula II. The compounds of Formula III are prepared either from the acids of Formula I or from the above-mentioned ketones. These starting materials are also novel compounds and are still another feature of this invention.

For the purpose of further clarity, the preparation of these starting materials, containing the various pyridyl moieties, will be described separately.

(A) PREPARATION OF THE STARTING MATERIALS FOR COMPOUNDS OF FORMULA I

Pyridyl benzoic acid compounds

Pyridine or substituted pyridine, such as 2-chloro pyridine, 3-methyl pyridine, 4-methylthio pyridine, 5-ethyl-2-methyl pyridine and the like, are reacted with a substituted or unsubstituted p-amino benzoic acid ester compound, such as ethyl 4-amino-3-chloro-benzoate ethyl-4-amino-3-methylbenzoate and the like, in the presence of iso-amyl nitrite at any convenient temperature to yield a pyridyl-benzoate ester. The condensation will take place at any one of the various free positions in the pyridine compound, thus leading to the 2, 3 or 4 pyridyl benzoic acid isomers. The temperature of the reaction is not critical and any convenient temperature from slightly above room temperature to the reflux temperature of the system may be used. Another procedure is first to form the diazonium salt of the benzoic acid, and then to react this compound under basic conditions with the pyridyl compound. The ester then is saponified or hydrolyzed by any well-known means to the corresponding starting pyridyl-benzoic acid compounds.

(B) PREPARATION OF STARTING MATERIALS FOR COMPOUNDS OF FORMULA II

Pyridyl phenylketone compounds

Known aminophenylpyridine compounds, such as 6-amino-2-phenylpyridine, 6-amino-4-phenylpyridine, 3-amino-2-phenylpyridine, and 5-amino-2-phenylpyridine, may be converted to appropriately substituted phenylpyridine compounds by a series of known reactions. For example, with an organic halide, such as methyl iodide, to form the mono- or di-alkyl substituted amino compound, or acylated to form an alkanoylamino compound. The amino compound may be diazotized and the diazo replaced by a hydroxy group, which in turn may be alkylated to form an alkoxy compound. The diazonium salt derived from the amino compound may also be treated with ethyl xanthate followed by saponification of the xanthate under alkaline conditions to give the mercapto compound, which may, if desired, then be alkylated with a dialkylsulfate or alkylhalide to the alkylmercapto compound. Also, the diazonium compound may be reacted with a cuprous halide in the cold under acid conditions to form the halide compound or reacted with cuprous cyanide to form a cyano compound, which may then be subjected to acid hydrolysis to form a carboxamide derivative. The appropriately substituted phenylpyridine compound, prepared as indicated above, is then nitrated by any known procedure, such as reaction with concentrated nitric acid in concentrated sulfuric acid to form a substituted pyridylnitrobenzene compound. This nitro compound is then converted to the starting pyridylphenyl ketone compound by following known reactions.

(I) PREPARATION OF ACID COMPOUNDS OF FORMULA I

The appropriate heterocyclic benzoic acid compound, obtained from A, is converted to its acid halide by any well-known means, i.e., reaction with a thionyl halide in an inert solvent. This acid halide is subsequently treated with a solution of ethereal diazomethane to form the corresponding diazoketone compound. The diazo compound is then reacted with silver oxide, in alcohol, to form the corresponding heterocyclic phenylacetic acid ester. The ester is then converted by any well-known means to the desired heterocyclic phenylacetic acid compound. Alternatively, the diazoketone may be reacted with silver oxide in water to form the free acid compound directly.

This process may be illustrated as follows:

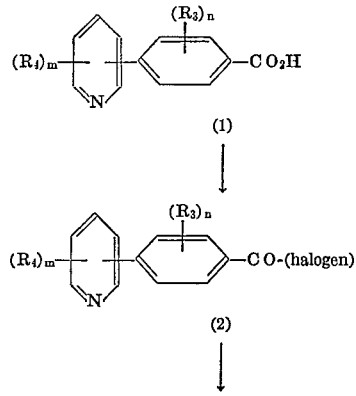

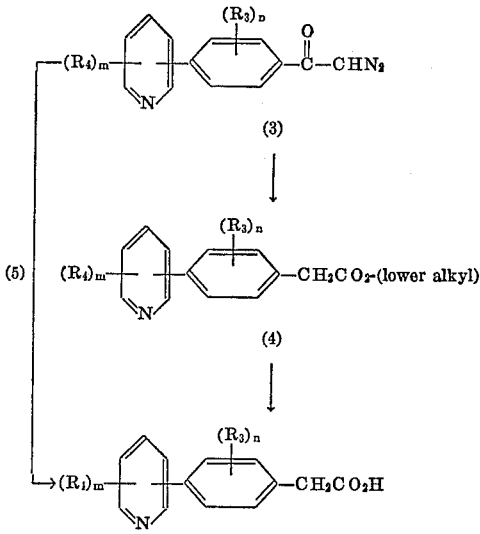

EQUIVALENTS

All groups are as previously indicated, except that $R_3$ and $R_4$ may be only hydrogen, halogen, trihalomethyl, nitro, di(lower alkyl)sulfamyl, lower alkylsulfamyl or di(lower alkyl)carboxaomido. When other groups are desired, the nitro group is converted to the desired group at the acetic acid or ester stage of the synthesis, by the appropriate series of reactions well-known in the art. Alternatively, the final compound may be nitrated whereupon the nitro compound may be converted to be the desired substituted compound. This nitration may be carried out on all the pyridylphenylacetic acid compounds.

REACTIONS AND CONDITIONS

Step 1.—Reaction by any known means, such as reaction with an acid halide of an inorganic acid, such as thionyl chloride, phosphorus pentachloride, phosphorus oxychloride, phosphorus trichloride, and the like, preferably thionyl chloride in an inert solvent[ethers, chloroform, aromatic solvents (benzene, toluene), and the like] preferably chloroform or ethers at any suitable temperature (0-reflux), preferably at elevated temperatures, but especially at or near the reflux temperature of the system.

Step 2.—Reaction with diazomethane in an inert solvent, such as ethers, chloroform, aromatic solvents (benzene, toluene), and the like, preferably ether, tetrahydrofuran or chloroform, but especially ether at any suitable temperature (R.T. or below), preferably 0 to −5° C.

Step 3.—Reaction with an alcohol and a catalyst, such as silver oxide, copper, or platinum, preferably silver oxide, either in the alcohol as solvent also or in an inert solvent, such as aromatic solvents, ethers, and the like, preferably using the alcohol as solvent, at any suitable temperature (R.T. to reflux), preferably at elevated temperatures, but especially at or near the reflux temperature of the system.

Step 4.—Hydrolysis or saponification by any known means, such as reaction with a base and subsequent such as reaction with a base and subsequent neutralization of the mixture with a mineral acid.

Step 5.—Same as Step 3, except an inert solvent, such as dioxane, is used and water is used in place of the alcohol.

Reaction Step 1 is a common reaction of converting an acid to an acid halide, and although a method has been indicated, many other methods well-known in the art may also be employed.

Step 2 in the above illustration is carried out by reacting the acid halide, preferably the acid chloride, in an inert solvent with a solution of an excess of diazomethane in an inert solvent. The inert solvent used is not critical; therefore, any solvent inert to the reactants, such as aromatic solvents (benzene, toluene) or various ethers, may be used. It is preferred, however, to use ether or THF. In order to avoid side reactions and loss of yield, the acid halide-inert solvent mixture is generally added to an excess of diazomethane solution at reduced temperatures. However, any molar ratio of diazomethane and the acid halide, low temperatures to slightly elevated temperatures, are within the contemplation of this invention. This reaction step is preferably carried out at 0 to —5° C., adding the acid chloride-ether solution to at least 3 moles of a solution of diazomethane in ether.

In Reaction Step 3, it is highly preferred as a safety precaution to first remove the excess diazomethane from the previous step. Almost any alcohol may be used in this step, and generally the alcohol which will yield the desired ester, as described in this invention, is used. When the alcohol is also suitable as a solvent, it is preferred over the use of an inert solvent; however, when solubility or other factors dictate the use of an inert solvent, the results are the same. The amount of alcohol is not critical and will only determine the extent of ester formation.

In Reaction Step 4, any of the many well-known methods of converting an ester to an acid may be used; the method indicated is only one of such methods.

(II) PREPARATION OF ACID COMPOUNDS OF FORMULA II

The appropriate heterocyclic phenylketone compound obtained from B is converted to a cyanohydrin compound which is then treated with a mineral acid to form a hydroxyamide compound. The hydroxy amide is then converted to the hydroxy acid compound, which compound is reacted with a strong acid to form the desired pyridyl α-alkylidene phenylacetic acid of Formula II.

Additionally, the α-alkylidene compound thus formed may be reacted with diazomethane to form an α-pyrazolino compound, which, upon heating, is converted to the acid compound of Formula II wherein R forms a cyclopropyl group with the α-carbon. This process may be illustrated as follows:

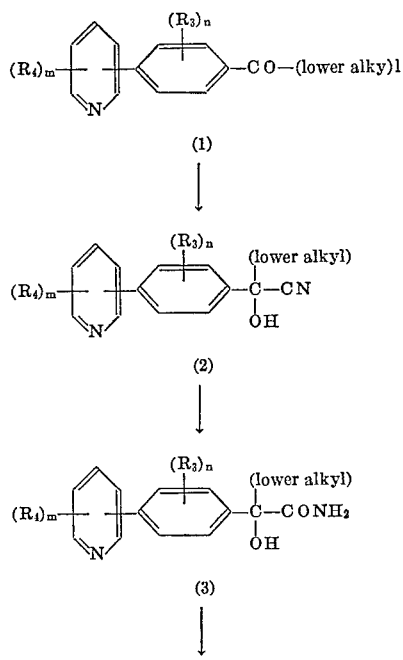

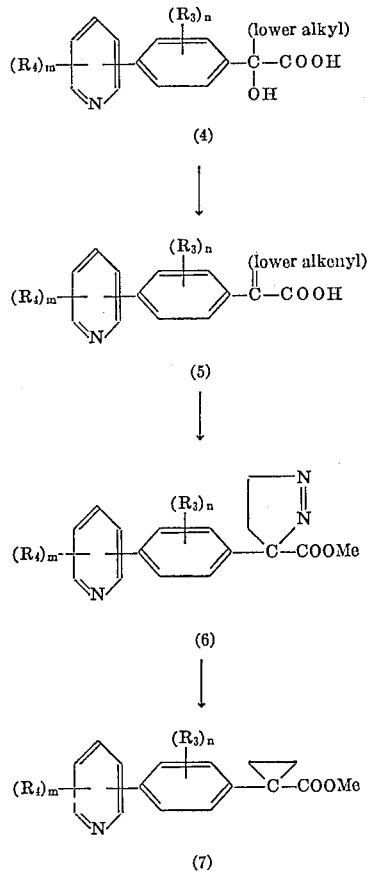

EQUIVALENTS

As previously described, excepting such groups as are subsequently indicated.

REACTIONS AND CONDITIONS

Step 1.—Reaction with a cyano compound, such as sodium cyanide, potassium cyanide, hydrogen cyanide, lower ketone cyanohydrin, and the like [preferably hydrogen cyanide with an amine, such as a primary, secondary, or tertiary aliphatic amine (ethylamine, propylamine, diethylamine, and trimethylamine piperidine)], in a solvent, such as lower alaknols (methanol, ethanol, propanol, and the like), liquid hydrogen cyanide, ethers, dioxane, tetrahydrofuran, water, mixtures of water and the above organic solvents, lower alkanoic acids (acetic, propionic, and the like), and mixtures of the acids and the above solvents, preferably, however, using liquid hydrogen cyanide as the reactant as well as the solvent at any suitable temperature, preferably —10 to —25° C., but especially 0 to 5° C., until the reaction is substantially complete.

Step 2.—Reaction with a mineral acid (hydrogen chloride, hydrogen bromide, sulfuric acid, phosphoric acid, and the like, preferably fortified hydrochloric acid) in an inert solvent, such as lower alkanols (methanol, ethanol, propanol), ether dioxane, tetrahydrofuran, and the like, preferably employing the acid as the solvent also, between temperatures of 0° and 50° C., preferably at or below room temperature, until the reaction is substantially complete.

Step 3.—Reaction with aqueous alkali or alkali earth hydroxides, such as sodium, potassium, barium, lithium, and strontinum hydroxides, or non-aqueous alkali and alkali earth hydroxides with lower alkanols (methanol, propanol, and the like), ethylene glycol, and the like, aqueous ammonium hydroxide, organic amines, such as lower aliphatic amines, and the like, preferably aqueous sodium or potassium hydroxide, but especially concentrated aqueous sodium hydroxide (6–12 N) using the above aqueous hydroxides as the solvents or lower alkanols as the solvents, preferably using the aqueous hydroxide reactants as solvents also, at any desirable temperature (0° C. to reflux), preferably at or near reflux, until the reaction is substantially complete.

Step 4.—Reaction in an acid medium using strong acids, such as p-toluenesulfonic acid, p-nitrobenzene-sulfonic acid, benzenesulfonic acid, trichloroacetic acid, a mixture of acetic acid and sulfuric acid, and the like, preferably toluenesulfonic acid, in an inert solvent, such as aromatic compounds (benzene, toluene, xylene, and the like), dioxane, tetrahydrofuran, lower alkanoic acids (acetic acid, propionic acid, and the like), preferably acetic acid or tetrahydrofuran, at elevated temperatures (75–150° C., preferably at or near the reflux temperature of the system) until the reaction is substantially complete.

Step 5.—Reaction with diazomethane in an inert solvent, such as aromatic hydrocarbons, benzene, toluene, and the like, or various ethers, at ambient temperatures until the reaction is complete.

Step 6.—Reaction at elevated temperature until reaction is substantially complete, preferably reaction on a steam-bath.

In Step 1, when it is desired to employ the cyanide salt, it is necessary to have the reaction mixture at a pH below 7. This is necessary in order to have the cyanide salt react as the acid. When the preferred procedure is used, namely, using hydrogen cyanide, the use of an amine, such as piperidine or a tertiary amine, is highly preferred, although not absolutely necessary.

In Step 2, an acid condition is necessary to obtain this reaction, and those acids as previously indicated may be used. The reaction may be run above a temperature of 50° C. However, when higher temperatures are used, a mixture of the desired compound as well as the alkylenyl acid is obtained, and it is possible that the reaction may be run at temperatures wherein only the alkylenyl acid compound is obtained.

In Step 5, generally an excess of diazomethane in an inert solvent, such as ether, is added to the α-methylene compound at ambient temperatures. After addition, the excess diazomethane may be evaporated. When the α-methylene acid is used, the diazomethane also esterifies the free acid. Therefore, the α-pyrazolino compound formed is the ester. This ester may be reacted according to Step 6 or the free acid may be prepared just before going to Step 6.

It is to be noted that when a nitro, trihalomethyl, cyano, carboxamido, or alkanoylamino group is desired, the pyridyl phenylacetic acid compound of Formula II is prepared first. The pyridyl phenylacetic acid compound is then nitrated to form the desired nitro group on the phenyl moiety, and the nitro compound subsequently converted to the other desired groups by processes well-known in the art.

(III) PREPARATION OF ACID COMPOUNDS OF FORMULA III

These compounds are prepared by one of two processes, designated as process (a) and (b).

Process (a).—This process is used when R′ is lower alkyl, lower alkenyl, lower alkynyl or halo lower alkyl, and R″ is hydrogen. In this process, an ester of structural Formula I is, through a series of reactions, alkylated to the α-substituted ester compound, followed by conversion back to the desired acid.

This process may be represented as follows:

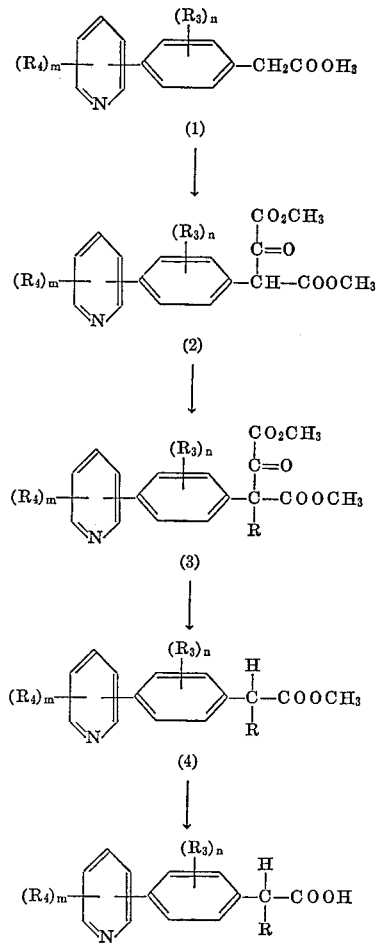

EQUIVALENTS

R is a lower alkyl, lower alkenyl, lower alkynyl or haloloweralkyl; all other substituents are as previously defined, with exceptions as later noted.

REACTIONS AND CONDITIONS

Step 1.—Reaction with a lower alkyl oxalate, such as dimethyl oxalate, diethyl oxalate dibenzyl oxalate, and the like, preferably dimethyl oxalate, and with a strong base such as potassium t-butoxide, sodium t-butoxide, sodium ethoxide, sodium hydride, methyl lithium, and the like, preferably an alkali t-butoxide and especially potassium t-butoxide in an inert solvent, such as aromatic solvents (benzene), ethers, and the like, preferably aromatic solvents and especially benzene, at any suitable temperature (R.T.=reflux), preferably at elevated temperatures, but especially at or near the reflux temperature of the system until the reaction is substantially complete.

Step 2.—Reaction of the alkali enolate with a lower alkyl halide (methyl iodide, isopropyl bromide, ethyl bromide, and the like), lower alkyl dihalide (β-chloropropyl iodide, α-chlorobutyl iodide, β-bromopropyl iodide, lower alkene halide (prop-2-en chloride, but-3-en bromide, and the like), or with a lower alkyne halide (prop-2-yn bromide, but-3-yn chloride, and the like, preferably a lower alkyl iodide and especially methyl iodide in an enolate salt-dissolving solvent, such as dimethylformamide, tetrahydrofuran, dimethoxyethanol, and dimethylsulfoxide at any suitable temperature (R.T. to reflux), preferably at elevated temperatures until the reaction is substantially complete.

Step 3.—Reaction with an alkali alkoxide, such as sodium methoxide, sodium ethoxide, and the like, preferably alkali methoxide and especially sodium methoxide in an inert solvent, such as aromatic solvents, ethers, alcohols, and the like, preferably lower alcohols and especially methanol at any suitable temperature (R.T. to reflux), preferably elevated temperatures and especially at or near the reflux temperature of the system until the reaction is substantially complete, followed by neutralization with an aqueous dilute mineral acid, such as hydrohalic acid, sulfuric acid, and the like, preferably hydrochloric acid.

Step 4.—Conversion to the corresponding acid by any well-known means, such as saponification or hydrolysis, preferably saponification with an inorganic base and neutralization of the acid salt with a dilute mineral acid.

In Reaction Step 1, the type of ester used is not critical, since the ester is used primarily as a protecting group. The amount of alkoxide and/or oxalate used is only a factor in obtaining higher yields of enolate and, therefore, less than equimolar ratios may be used. However, it is preferred to use an excess of both the alkoxide and oxalate.

In Reaction Steps 2 and 3, the molar ratios of reactants are not critical and, as in Step 1, are only a factor in obtaining higher yields.

Reaction Step 4 is simply the conversion of the ester back to its corresponding acid, which can be carried out by any known means, one such means being indicated and preferred. If it is desired, this step may be eliminated, and the esters of Step 3 will represent still other compounds of Structural Formula III.

The $R_3$ and $R_4$ substituents of the starting α-unsubstituted pyridyl phenylacetates in this process may be lower alkyl, nitro, halo, trifluoro, di(lower alkyl)sulfamyl, lower alkylthio, lower alkylsulfonyl, and di(lower alkyl) carbamyl. When the other $R_3$ and $R_4$ groups are desired, the pyridyl nitro phenylacetic acid or ester final compound prepared as above may be converted to the desired group by proper reaction of the nitro substituent by any of the well-known procedures in the art.

Process (b).—This is an alternative process which may be used when R' is to be lower alkyl, and R", hydrogen. The α-alkylidene acids (Formula II) may be reacted with hydrogen to form the desired α-lower alkyl Formula III compound.

This process may be represented as follows:

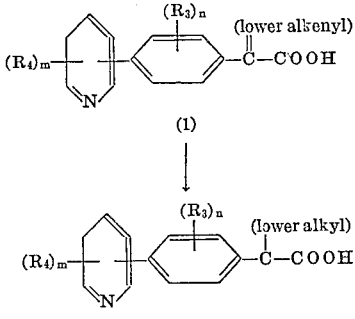

EQUIVALENTS

As previously described for the preparation of Formula II compounds.

REACTIONS AND CONDITIONS

Step 1.—Reduction over a catalyst, such as palladium, platinum or Raney nickel, and the like, preferably 5–10% platinum oxide under moderate hydrogen pressure (5–60 pounds, preferably 40 pounds) in an inert solvent, such as lower alkanols (methanol, ethanol, butanol, and the like), aromatic compounds (benzene, toluene, xylene, and the like), tetrahydrofuran dioxane, acetic acid, and the like, at any suitable temperature (0° C. to reflux), preferably at ambient temperatures in ethanol until the reaction is substantially complete.

The compounds of Formulae I, II, and III, of this invention, wherein X is other than COOH, may be prepared from the corresponding acid compounds.

The process for the preparation of the esters may be carried out by reaction of the corresponding acid with a strong acid, such as hydrochloric acid, sulfuric acid, toluenesulfonic acid, p-nitrotoluenesulfonic acid, benzenesulfonic acid, and the like (preferably 1–3% concentrated sulfuric acid), and with the appropriate alcohol. The alcohol may be used as a solvent also or an inert solvent, such as tetrahydrofuran, ether, or dioxane, may be used. The reaction may be carried out at any suitable temperature; however, it is preferably carried out at or near the reflux temperature of the system. Esterifications are well-known reactions in the art, and although a particular esterification reaction is indicated here, the acid may be esterified by any known means. When the alcohol is not suitable for use as a solvent, inert solvents are used along with the alcohol. When using phenol as the alcohol for the esterification step, it is highly preferred to azeotrope the water formed so as to allow ester formation. Another highly suitable procedure for this esterification step is the reaction of the acid with at least one mole of a diimide (such as dicyclohexylcarbodiimide) and the appropriate alcohol in an inert solvent, such as tetrahydrofuran.

The process for the preparation of the amide compounds of this invention may be carried out by reacting the corresponding acid with thionyl chloride, thionyl bromide, phosphorus oxychloride, phosphorus oxybromide, phosphorus pentachloride, or phosphorus pentabromide, in an inert solvent such as ether, benzene, toluene, xylene, tetrahydrofuran, dioxane, and the like, followed by reaction with an excess of the desired amine at any suitable temperature (0° C. to room temperature preferred) or reaction with dicyclohexylcarbodiimide and an excess of the amine at any suitable temperature until the reaction is substantially complete. When primary amides are desired, ammonia may be employed; when secondary amides are required, primary aliphatic or aromatic amines are employed such as propylamine, benzylamine, β-phenethylamine, aniline, and the like. To obtain cyclic amides, N-unsubstituted cyclic amines such as pyrrolidine, piperidine, morpholine, and the like, are employed. It is generally preferred to run this reaction with the amine acting as the solvent also; however, when this cannot be conveniently done, an inert solvent such as indicated above may be used. In addition, it is preferred to remove the excess reagent and acidic by-product formed in this reaction prior to the addition of the amine. However, the acid may be neutralized by using an excess of the amine. An alternative procedure is to react the pyridyl phenylacetic acid compound with dicyclohexylcarbodiimide and the desired amine. The three components may be mixed at any suitable temperature (−10° C. to 50° C.), but are preferably mixed at ambient temperatures for several hours. The dicyclohexylcarbodiimide procedure is exclusively used when the $R_3$ and $R_4$ groups are affected by the acid halide procedure. Such groups are the amino, monoalkyl, and dialkylamino, and carboxamido.

The process for the preparation of the aldehyde compounds of this invention may be carried out by reacting the corresponding pyridyl phenylacetic acid compounds with a compound, such as thionyl chloride, thionyl bromide, phosphorus pentachloride, phosphorus pentabromide, phosphorus oxychloride, phosphorus oxybromide, and the like, but preferably thionyl chloride in an inert solvent to form the acid halide and subsequent reduction of the acid halide to the aldehyde. The inert solvents used may be benzene, toluene, xylene, ethers (diethyl ether, dioxane), tetrahydrofuran, or the like, preferably benzene or toluene. Any suitable temperature may be employed (room temperature to reflux); however, it is preferred to use temperatures at or near the reflux temperature of the system until the formation of the acid halide is substantially complete. The acid halide is then reacted with a Rosenmund catalyst, such as 5% Pd on BaSO$_4$ with quinoline, or with a tritertiarybutoxy alkali or alkali earth aluminum hydride, such as potassium, sodium, or lithium aluminum hydride, and the like. The reduction is preferably carried out with a tritertiarybutoxy alkali or alkali earth aluminum hydride, particularly with tritertiarybutoxy lithium aluminum hydride in tetrahydrofuran or ether. However, the inert solvent may also be benzene, toluene, xylene, ethers (diethyl ether, dioxane), and the like. The reaction may be carried out at any suitable temperature (−80° C. to room temperature), but preferably −35 to −15° C. until the reaction is substantially complete.

It is preferred to remove the inorganic acid formed after the acid halide preparation; otherwise, the inorganic acid would preferentially consume the subsequent addition of the halide. However, if it is desired, the inorganic acid may remain if an excess of the hydride is used to react with the inorganic acid as well as with the acid halide. When the butoxide reagent is used, it is preferred to use temperatures below 0° C. If temperatures above 0° C. are used, the reduction will lead to the corresponding alcohol instead of the aldehyde. As indicated, although higher temperatures may be used, it is not economically feasible, for a reaction temperature will be reached wherein the corresponding alcohol will be almost exclusively produced. However, if the alcohol is desired, this is still another way of going directly from the acid to the alcohol.

In the preparation of these aldehydes, the acid starting materials containing the primary amino or secondary amino group and carboxamido group may not be used unless these groups are protected in some way. Protection may be accomplished by benzylating the amino group prior to this reaction. During the reaction the acid group will be reduced to the aldehyde and the protected amino group will be debenzylated to yield the desired amino group.

The process for the preparation of the acetal compounds of this invention may be carried out by reacting the previously prepared aldehyde compound with a lower alkanol in the presence of a strong acid. Examples of strong acids contemplated for this reaction are toluenesulfonic acid, p-nitrobenzenesulfonic acid, and mineral acids (hydrochloric acid, sulfuric acid, and borontrifluoride). It is preferred to use a catalytic amount of toluenesulfonic acid or concentrated hydrochloric acid in a lower alkanol (methanol, ethanol, butanol, and the like) at any suitable temperature. However, the solvents used may be aromatic compounds or combinations of the alcohol and ethers as well as the alcohol itself. The reaction temperature is not critical, and therefore temperatures from 0° C. to reflux may easily be used, although ambient temperatures are preferred. The quantity of acid is not critical; all that is required is that the acid be of sufficient strength to catalyze the reaction. Alternatively, the reaction may be carried out by employing the aldehyde and the appropriate lower alkyl orthoformate. When it is desired to isolate the acetal and water is to be used in the isolation, the reaction mixture must be neutralized with a base, such as sodium carbonate, so as to prevent the hydrolysis of the acetal back to the aldehyde.

The alcohols of this invention may be obtained by reaction of the corresponding acid compound with an alkali or alkali earth aluminum hydride. Almost any solvent may be used as long as it is inert to the hydride and the reactants have some degree of solubility in it. Preferred inert solvents are tetrahydrofuran and diethyl ether. The temperature of this reaction is not critical; therefore, under these conditions, temperatures from −15° C. to reflux are well within the contemplation of this invention. Complex metal hydrides, such as lithium, aluminum hydride, and the like, used may be less than the theoretical amount; however, it is preferred to use 200–400% excess of the preferred lithium aluminum hydride. After the reaction, the excess hydride is decomposed by addition of ethyl acetate or an active hydrogen reactant, such as alcohols, water or dilute aqueous mineral acids. The alcohol compound obtained from this reaction is in the form of its salt, and therefore an aqueous acid is used to convert the alcohol salt to the free alcohol. Such acids may be hydrochloric, ammonium chloride, sulfuric, and the like. This portion of the reaction is preferably carried out at 0° C. to ambient temperatures by first adding water, followed by dilute sulfuric acid. The ester may also be reduced catalytically using such catalyst as ruthenium. When the former procedure is used, the $R_3$ and $R_4$ substituents may only be lower alkylthio, halogen, trihalomethyl, lower alkyl, and dilower alkylamino. When the latter procedure is used, the $R_3$ and $R_4$ may be any group other than cyano, nitro, or sulfonyl.

The ether compounds of this invention are prepared from the corresponding alcohols. The alcohol is reacted with a strongly basic condensing agent, such as sodium hydride, potassium hydroxide, potassium tertiary butoxide, or sodamide, and a lower alkyl halide (methyl iodide, allyl chloride, β-phenethyl bromide, or ethyl bromide, and the like), preferably sodium hydride and 50% excess of methyl iodide. Although dimethylformamide is generally used as the solvent, any non-active hydrogen solvent may be used, such as aromatic solvents (benzene, toluene), ethers (diethyl ether, dioxane, tetrahydrofuran), and the like. The reaction is generally carried out at ambient temperatures; however, temperatures from 0–50° C. may be conveniently used also. The quantity of reagents used will affect the yield of the ether; therefore, it is generally preferred to use an excess of the hydride and halide. Additionally, the excess hydride is used to consume any active hydrogen materials which may be present in the starting alcohol compound. Additionally, since this reaction employs a strongly basic condensing agent, as in the first alcohol synthesis, the same limitations as to substituents apply to this reaction as did with that alcohol synthesis. It is to be noted that whenever a nitro group is desired on the heterocyclic phenyl ring and the synthesis of the side-chain will affect the nitro group, the nitro group is placed on the heterocyclic phenyl ring by proper nitration after the final side-chain has been obtained.

The non-toxic salts of the acid compounds of this invention may be prepared by procedures well-known in the art. For example, the pyridyl phenylacetic acid may be reacted with an inorganic base in an inert solvent and the solution evaporated to yield the desired salt.

The following examples are given by way of illustration:

EXAMPLE 1

Ethyl-4-(2-pyridyl)-3-chlorobenzoate

Ethyl-4-(3-pyridyl)-3-chlorobenzoate

Ethyl-4-(4-pyridyl)-3-chlorobenzoate

A mixture of 0.055 mole of ethyl-4-amino-3-chlorobenzoate, 200 ml. of pyridine, and 0.077 mole of isoamyl nitrite is warmed until a vigorous reaction with evolution of gas begins. The evolution of the gas is then allowed to proceed, without heating the reaction mixture, until the evolution has subsided. At this point, the reaction mixture is heated on a steam-bath for an additional 2 hours. The excess pyridine and the low boiling products are then removed in vacuo and a mixture of ethyl-4-(2-pyridyl)-3-chlorobenzoate, ethyl - 4 - (3-pyridyl)-3-chlorobenzoate, and ethyl - 4 - (4 - pyridyl) - 3 - chlorobenzoate is obtained. These products are then separated by chromatography, using a neutral alumina column and increasing proportions of ether-petroleum benzene as the eluent.

When the procedure above is followed, using pyridine and ethyl - 4 - amino - 3 - methylthiobenzoate, ethyl - 4 - amino-3-fluorobenzoate, ethyl-4-amino-3-methoxybenzoate, ethyl-4-amino-3-methylbenzoate, ethyl-4-amino-3-nitrobenzoate or ethyl-4-amino-3-chlorobenzoate, there are obtained the corresponding ethyl-4-(2-pyridyl)-3-substituted benzoates, ethyl-4-(3-pyridyl)-3-substituted-benzoates, and ethyl-4-(4-pyridyl)-3-substituted-benzoates.

EXAMPLE 2

2-phenyl-6-chloropyridine

A suspension of 0.045 mole of 2-phenyl-6-aminopyridine and 18 ml. of concentrated hydrochloric acid in 16 ml. of water is heated until the solid dissolves. The solution is then cooled to 0° C. and 3.24 grams of sodium nitrite and 6 ml. of water is added to the chilled, stirred solution. After the reaction mixture has remained in an ice-bath for 15 minutes, 13.2 grams of cuprous chloride dissolved in 240 ml. of concentrated hydrochloric acid is added dropwise with vigorous stirring to the chilled mixture. The mixture is then stirred overnight at room temperature. At this point, the reaction mixture is poured into 500 grams of ice, made slightly alkaline with dilute sodium hydroxide, the product extracted with (5× 200 ml.) ether, and the combined ether extracts washed with water until neutral. The ether solution is dried over magnesium sulfate, filtered, and concentrated in vacuo. The residue thus obtained is then chromatographed on a column of neutral alumina using ether-benzene mixture as eluent to yield 2-phenyl-6-chloropyridine.

When 4-phenyl-6-aminopyridine, 2-phenyl-3-aminopyridine, and 2-phenyl-5-aminopyridine are used in place of 2-phenyl-6-aminopyridine in the above example, there are obtained the corresponding chloro compounds.

EXAMPLE 3

2-p-nitrophenyl-6-chloropyridine

A mixture of 0.05 mole of 2-phenyl-6-chloro-pyridine and 0.05 mole of concentrated nitric acid is added gradually to 24 ml. of concentrated sulfuric acid, which is cooled with water. After keeping the reaction mixture for 5 minutes at ambient temperatures, the reaction mixture is heated for ½ hour at 100° C. The reaction mixture is then diluted with 120 ml. of water, and while the reaction mixture is maintained above 60° C., the product is precipitated fractionally with 5 N ammonia.

When the 2-phenyl-6-methoxypyridine is used in place of 2-phenyl-6-chloropyridine in the above example, there is obtained 2-p-nitrophenyl-6-methoxy-pyridine.

EXAMPLE 4

2-p-aminophenyl-6-chloropyridine

To a solution of 0.1 mole of 2-p-nitrophenyl-6-chloropyridine in 250 ml. of ethanol is added a suspension of ½ gram of platinum oxide in 10 ml. of concentrated hydrochloric acid. The mixture is then hydrogenated at room temperature for 1 hour. The catalyst is removed by filtration. The filtrate is then concentrated in vacuo. The residue is then neutralized with a solution of aqueous sodium hydroxide and the alkaline mixture extracted with excess ether. The ether is then concentrated in vacuo to yield 2-p-aminophenyl-6-chloropyridine.

When 2-p-nitrophenyl-6-methoxypyridine obtained from Example 3 and 2-p-nitrophenylpyride, 3-p-nitrophenylpyridine, and 4-p-nitrophenylpyridine are used in place of 2-p-nitrophenyl-6-chloropyridine in the above example, there are obtained the corresponding p-aminophenyl compounds.

EXAMPLE 5

2-p-cyanophenyl-6-chloropyridine

A mixture of 4 grams of 2-p-aminophenyl-6-chloropyridine, 10 ml. of concentrated hydrochloric acid, and 15 ml. of water is diazotized at 10° C. with a solution of 3.5 grams of sodium nitrile in 20 ml. of water. The diazonium reaction mixture thus obtained is added in 5 ml. portions, with frequent shaking, to a warm solution of cuprous cyanide prepared by adding aqueous potassium cyanide (3.5 grams in 10 ml. of water) to warm aqueous copper sulfate (3 grams in 12.5 ml. of water). Rapid evolution of nitrogen occurs, and when the addition of the diazonium mixture is complete, the reaction mixture is warmed on a steam-bath. The mixture is then made slightly alkaline with ammonia and extracted with excess ether. The ether is removed and the residue is purified by elution from a neutral alumina column with 50% ether-petroleum ether to yield 2-p-cyanophenyl-6-chloropyridine.

When the p-aminophenylpyridine compounds obtained from Example 4 are used in place of 2-p-aminophenyl-6-chloropyridine in the above example, there are obtained the corresponding p-cyanophenylpyridine compounds.

EXAMPLE 6

4-(2-pyridyl)-3-chlorobenzoic acid

A solution of 0.01 mole of potassium hydroxide in 3 ml. of water is added to a cooled solution of 0.01 mole of ethyl-4-(2-pyridyl)-3-chlorobenzoate in 30 ml. of methanol. Additional water or methanol is added until the faintest cloudiness persists and the mixture is stirred overnight at room temperature. To this reaction mixture is added an excess of water and the methanol removed in vacuo. The aqueous mixture is then washed well with ether, neutralized with 2.5 N hydrochloric acid, and extracted with (3× 25 ml.) chloroform. The combined chloroform extracts are dried over anhydrous magnesium sulfate and the mixture filtered and the chloroform removed in vacuo to yield 4-(2-pyridyl)-3-chlorobenzoic acid.

When ethyl-4-(3-pyridyl)-3-chlorobenzoate, ethyl-4-(4-pyridyl)-3-chlorobenzoate, the ethyl-4-(2-pyridyl)-3-substituted-benzoate compounds, the ethyl-4-(3-pyridyl)-3-substituted-benzoate compounds, and the ethyl-4-(4-pyridyl)-3-substituted-benzoate compounds, obtained from Example 1 are used in place of ethyl-4-(2-pyridyl)-3-chlorobenzoate in the above example, there are obtained the corresponding 4-(3-pyridyl)-3-chlorobenzoic acid, 4-(4-pyridyl)-3-chlorobenzoic acid, 4-(2-pyridyl)-3-substituted-benzoic acid compounds, the 4-(3-pyridyl)-3-substituted-benzoic acid compounds, and the 4-(4-pyridyl)-3-substituted-benzoic acid compounds.

EXAMPLE 7

4-(2-pyridyl)-3-chlorodiazoacetophenone (A) 4-(2-PYRIDYL)-3-CHLOROBENZOIC ACID CHLORIDE 0.01 mole of 4-(2-pyridyl)-3-chlorobenzoic acid and and 0.02 mole of thionyl chloride are added to 50 ml. of chloroform. After the initial reaction, the mixture is refluxed on a steam-bath for 2 hours. The reaction mixture is then concentrated in vacuo, 20 ml. of benzene added, and again concentrated in vacuo.

(B) 4-(2-PYRIDYL)-3-CHLORODIAZOACETOPHENONE

To the residue obtained from Part A, is added 30 ml. of cold ether and the ethereal solution treated with an excess of diazomethane. The reaction mixture is allowed to warm to room temperature and stirred for 6 hours. The solvent is then removed in vacuo to yield crude 4-(2-pyridyl)-3-chlorodiazoacetophenone.

When 4-(3-pyridyl)-3-chlorobenzoic acid, 4-(4-dyl)-dyl)-3-chlorobenzoic acid, the 4-(2-pyridyl)-3-substituted-benzoic acid compounds, the 4-(3-pyridyl)-3-substituted-benzoic acid compounds, and the 4-(4-pyridyl)-3-substituted-benzoic acid compounds obtained from Example 6 are used in place of 4-(2-pyridyl)-3-chlorobenzoic acid in the above example, there are obtained the corresponding 4-(3-pyridyl)-3-chlorodiazoacetophenone, 4-(4-pyridyl)-3-chlorodiazoacetophenone, the 4-(2-pyridyl) - 3 - substituted - diazoacetophenone compounds, the 4 - (3 - pyridiyl) - 3 - substituted - diazoacetophenone compounds, and the 4-(4-pyridyl)-3-substituted-diazoacetophenone compounds.

EXAMPLE 8

Ethyl-4-(2-pyridyl)-3-chlorophenylacetate

To a solution of 0.01 mole of 4-(2-pyridyl)-3-chlorodiazoacetophenone in 50 ml. of ethanol at 55° C. is added portion-wise a slurry of 3 grams of freshly precipitated silver oxide in 30 ml. of ethanol and the reaction mixture stirred. After evolution of the nitrogen subsides, the reaction mixture is refluxed for approximately 1 hour, subsequently treated with charcoal, filtered, and the filtrate concentrated in vacuo. The crude ester is purified by chromatography on an acid-washed alumina column using ether-ethyl acetate as the eluent.

When 4-(3-pyridyl)-3-chlorodiazoacetophenone, 4-(4-pyridyl)-3-chlorodiazoacetophenone, the 4-(2-pyridyl)-3-substituted-diazoacetophenone compounds, the 4-(3-pyridyl)-3-substituted-diazoacetophenone compounds, and the 4-(4-pyridyl)-3-substituted-diazoacetophenone compounds obtained from Example 7 are used in place of 4-(2-pyridyl)-3-chlorodiazoacetophenone in the above example, there are obtained the corresponding ethyl-4-(3-pyridyl-3-chlorophenylacetate, ethyl-4-(4-pyridyl)-3-chlorophenylacetate, the ethyl-4-(2-pyridyl)-3-substituted-phenylacetate compounds, the ethyl-4-(3-pyridyl)-3-substituted-phenylacetate compounds, and the ethyl-4-(4-pyridyl)-3-substituted-phenylacetate compounds.

EXAMPLE 9

4-(2-pyridyl)-3-chlorophenylacetic acid

A solution of 14 grams of 4-(2-pyridyl)-3-chlorodiazoacetophenone in 100 ml. of dioxane is added dropwise with stirring to a mixture of 2 grams of silver oxide, 5 grams of anhydrous sodium carbonate, and 3 grams of sodium thiosulfate in 200 ml. of water at 50–60° C. The reaction mixture is stirred for an additional hour at a temperature of 90–100° C. The reaction mixture is then cooled, diluted with water, and neutralized with dilute nitric acid. The reaction mixture is then extracted with chloroform. The chloroform extract is washed with water, dried and evaporated in vacuo to yield 4-(2-pyridyl)-3-chlorophenylacetic acid.

When 4-(3-pyridyl)-3-chlorodiazoacetophenone, 4-(4-pyridyl)-3-chlorodiazoacetophenone, the 4-(2-pyridyl)-3-substituted-diazoacetophenone compounds, the 4-(3-pyridyl)-3-substituted-diazoacetophenone compounds, and the 4-(4-pyridyl) - 3 - substituted - diazoacetophenone compounds obtained from Example 7 are used in place of 4-(2-pyridyl)-3-chlorodiazoacetophenone in the above example, there are obtained the corresponding 4-(3-pyridyl)-3-chlorophenylacetic acid, 4-(4-pyridyl)-3-chlorophenylacetic acid, the 4-(2-pyridyl)-3-substituted-phenylacetic acid compounds, the 4-(3-pyridyl)-3-substituted-phenylacetic acid compounds, and the 4-(4-pyridyl)-3-substituted-phenylacetic acid compounds.

EXAMPLE 10

Ethyl-α-methyl-4-(2-pyridyl)-3-chlorophenylacetate

A mixture of 0.2 mole of ethyl-4-(2-pyridyl)-3-chlorophenylacetate, 40 grams of dimethyl-oxalate, and 40 grams of potassium tertiarybutoxide, and 500 ml. of benzene is refluxed under nitrogen for 4 hours with stirring. The cooled reaction mixture is then filtered and the cake washed with (4× 50 ml.) benzene, followed by (4× 50 ml.) ether and the cake dried in vacuo. A mixture of 0.05 mole of this cake and 0.06 mole of methyl iodide in 300 ml. of dimethylformamide is stirred at room temperature for 4 hours, then heated on a steam-bath until the reaction mixture is neutral. The reaction mixture is then cooled and to it is added 0.05 mole of sodium methoxide in 30 ml. of methanol and the reaction mixture is heated for an additional two hours on a steam-bath. The cooled reaction mixture is then added to 1 liter of ice-water containing 0.06 mole of hydrochloric acid. This reaction mixture is then extracted with (3× 200 ml.) ether and the combined ether extracts washed with water, sodium carbonate, and water. The ether solution is then dried over sodium sulfate and concentrated in vacuo to yield ethyl-α-methyl-4-(2-pyridyl)-3-chlorophenylacetate.

When ethyl iodide, propyl iodide, and butyl iodide are used in place of methyl iodide in the above example, there are obtained the corresponding ethyl-α-ethyl-4-(2-pyridyl)-3-chlorophenylacetate, ethyl-α-propyl-4-(2-pyridyl)-3-chlorophenylacetate, and ethyl-α-butyl-4-(2-pyridyl)-3-chlorophenylacetate compounds.

Similarly, when using ethyl-4-(3-pyridyl)-3-chlorophenylacetate, ethyl-4-(4-pyridyl)-3-chlorophenylacetate, the ethyl-4-(2 - pyridyl) - 3 - substituted - phenylacetate compounds, the ethyl-4-(3-pyridyl)-3-substituted-phenylacetate compounds, and the ethyl-4-(4-pyridyl)-3-substituted-phenylacetate compounds obtained from Example 8 in place of ethyl-4-(2-pyridyl)-3-chlorophenylacetate in the above example, there are obtained the corresponding ethyl-α-methyl-4-(3-pyridyl)-3-chlorophenylacetate, ethyl-α-methyl-4-(4-pyridyl)-3-chlorophenylacetate, the ethyl-α-methyl-4-(2-pyridyl)-3-substituted-phenylacetate compounds, the ethyl-α-methyl-4-(3-pyridyl)-3-substituted-phenylacetate compounds, and the ethyl-α-methyl-4-(4-pyridyl)-3-substituted-phenylacetate compounds.

Similarly, when prop-2-en iodide, but-3-yn iodide and 1,3-diodopropane are used in place of methyl iodide in the above example, there are obtained the corresponding α-prop-2-enyl, α-but-3-ynyl and α-3-iodopropyl compounds.

EXAMPLE 11

4'-[2-(6-chloropyridyl)]-acetophenone

A solution of 0.04 mole of 2-p-cyanophenyl-6-chloropyridine in 20 ml. of benzene is added dropwise with stirring over a period of one hour to a solution of methylmagnesium iodide (prepared from 3.6 ml. of methyl iodide and 1.2 grams of magnesium turnings and 50 ml. of ether.) The reaction mixture is diluted with 100 ml. benzene, heated to remove the ether, refluxed for 3 hours, then decomposed with an ice-cold solution of 20% hydrochloric acid. After keeping cold for one hour, the benzene layer is separated, the mixture is made alkaline with sodium carbonate, dried over anhydrous sodium sulfate, and the benzene concentrated in vacuo. The residue is then chromatographed on a silica gel column using 50% ether-petroleum benzin as the eluent to yield 4'-[2-(6-chloropyridyl)]-acetophenone.

When ethyl iodide is used in place of methyl iodide in the above example, there is obtained 4'-[2-(6-chloropyridyl)]-propiophenone.

Similarly, when the p-cyanophenylpyridine compound obtained from Example 5 is used in place of 2-p-cyanophenyl-6-chloropyridine in the above example, there is obtained the corresponding 4'-pyridylacetophenone.

EXAMPLE 12

α-Hydroxy-α-methyl-4-[2-(6-chloropyridyl)]-phenylacetamide

To a stirred solution of 1 ml. of piperidine in 30 ml. of liquid hydrogen cyanide is added 0.053 mole of 4'-[2-(6-chloropyridyl)]-acetophenone in small portions. After complete addition of the acetophenone compound, the reaction mixture is allowed to stir at 0°–5° C. for 15 minutes. At this point, 10 ml. of dry ether is added and the reaction mixture allowed to stir for an additional hour while still cooling. The reaction mixture is then added to 125 ml. of cold concentrated hydrochloric acid and then saturated with dry hydrogen chloride. The reaction mixture is allowed to come to room temperature over a period of 16 hours. The reaction mixture is then diluted with water, cooled, and made slightly alkaline with ammonia. The reaction mixture is then extracted with excess chloroform. The chloroform extracts are combined, washed with water, dried over anhydrous sodium sulfate, and concentrated in vacuo. The residue is then recrystallized from a benzene-petroleum benzin mixture to yield yield α-hydroxy-α-methyl - 4 - [2 - (6 - chloropyridyl)]-phenylacetamide.

When 4'-pyridylacetophenone, obtained from Example 11 is used in place of 4'-[2-(6-chloropyridyl)]-acetophenone in the above example, there is obtained α-hydroxy-α-methyl-4'-pyridylphenylacetamide.

EXAMPLE 13

α-Hydroxy-α-methyl-4-[2-(6-chloropyridyl)]-phenylacetic acid

A mixture of 0.0087 mole of α-hydroxy-α-methyl-4-[2-(6-chloropyridyl)]-phenylacetamide in 10 ml. of methanol and 14.5 ml. of 50% sodium hydroxide solution is refluxed for three hours. The reaction mixture is then diluted with water and carefully neutralized with concentrated hydrochloric acid. The precipitate is then extracted with excess chloroform and the chloroform extracts are dried over sodium sulfate and concentrated in vacuo. The residue is then recrystallized from a benzene-petroleum ether mixture to yield α-hydroxy-α-methyl-4-[2-(6-chloropyridyl)]-phenylacetic acid.

When α-hydroxy-α-methyl-4'-pyridylphenyl-acetamide, obtained from Example 12, is used in place of α-hydroxy-α-methyl-4-[2-(6-chloropyridyl)]-phenylacetic acid in the the above example, there is obtained α-hydroxy-α-methyl-4'-pyridylphenylacetic acid.

EXAMPLE 14

α-Methylene-4-[2-(6-chloropyridyl)]-phenylacetic acid

A mixture of 0.0041 mole of α-hydroxy-α-methyl-4-[2-(6-chloropyridyl)]-phenylacetic acid and 0.005 mole of p-toluenesulfonic acid in 50 ml. of dry benzene is refluxed for six hours. The reaction mixture is then washed with water, dried over sodium sulfate, and concentrated in vacuo. The residue is then recrystallized from a benzene-petroleum benzin mixture to yield α-methylene-4-[2-(6-chloropyridyl)]-phenylacetic acid.

When α-hydroxy-α-methyl-4'-pyridylphenyl-acetic acid obtained from Example 13 is used in place of α-hydroxy-α-methyl-4-[2-(6-chloropyridyl)]-phenylacetic acid in the above example, there is obtained α-methylene-4'-pyridylphenylacetic acid.

EXAMPLE 15

α-Methyl-4-[2-(6-chloropyridyl)]-phenylacetic acid

A solution of 0.015 mole of α-methylene-4-[2-(6-chloropyridyl)]-phenylacetic acid in 25 ml. of ethanol containing 0.1 gram of platinum oxide is treated with hydrogen at room temperature. After the required amount of hydrogen has been taken up, the reaction mixture is filtered and concentrated in vacuo. The residue is then recrystallized from hexane to yield α-methyl-4-[2-(6-chloropyridyl)]-phenylacetic acid.

EXAMPLE 16

Methyl-4-(2-pyridyl)-3-chlorophenylacetate

A mixture of 0.01 mole of 4-(2-pyridyl)-3-chlorophenylacetic acid and 8 ml. of concentrated sulfuric acid and 250 ml. of anhydrous methanol (ca. 3% sulfuric acid) is stirred at room temperature overnight. The solution is then concentrated in vacuo to approximately ⅓ the volume. 80 ml. of water are added, made slightly alkaline with ammonia, and the mixture extracted with (3× 50 ml.) ether. The combined ether extracts are washed with saturated potassium bicarbonate solution and water. The ether solution is then dried over magnesium sulfate, filtered, and concentrated to a residue. The residue is then chromatographed on a solica gel column (wt./wt. 50:1 gram crude) using an ether-petroleum ether system (v./v. 20–60%) as eluent to obtain methyl-4-(2-pyridyl)-3-chlorophenylacetate.

When the pyridylphenylacetic acid compounds, the α-methyl-pyridylphenylacetic acid compounds, the α-ethyl-pyridylphenylacetic acid compounds, the α-methylene-pyridylphenylacetic acid compounds, and the α-ethylidene-pyridylphenylacetic acid compounds obtained from Examples 9 and 14 are used in place of 4-(2-pyridyl)-3-chlorophenylacetic acid in the above example, there are obtained the corresponding methyl-pyridylphenylacetate compounds, the methyl-α-methyl-pyridylphenylacetate compounds, the methyl-α-ethyl-pyridylphenylacetate compounds, the methyl-α - methylene - pyridylphenylacetate compounds, and the methyl-α-ethylidene-pyridylphenylacetate compounds.

EXAMPLE 17

Sodium-4-(2-pyridyl)-3-chlorophenylacetate

A solution of 0.01 mole of sodium hydroxide in 15 ml. of water is added with stirring to a solution of 0.01 mole of 4-(2-pyridyl)-3-chlorophenylacetic acid in 25 ml. of methanol. At this point, additional methanol is added as needed to obtain complete solution and the solution stirred for 1 hour. The solution is then evaporated in vacuo to obtain a residue of sodium 4-(2-pyridyl)-3-chlorophenylacetate.

When potassium hydroxide is used in place of sodium hydroxide in the above example, there is obtained the corresponding potassium salt.

When pyridylphenylacetic acid compounds, the α-methyl-pyridylphenylacetic acid compounds, the α-ethyl-pyridylphenylacetic acid compounds, the α - methylene-pyridylphenylacetic acid compounds, and the α-ethylene-pyridylphenylacetic acid compounds obtained from Examples 9 and 14 are used in place of 4-(2-pyridyl)-3-chlorophenylacetic acid in the above example, there are obtained the corresponding sodium-pyridylphenylacetate compounds, the sodium-α-methyl-pyridylphenylacetate compounds, the sodium-α-ethyl-pyridylphenylacetate compounds, the sodium-α-methylene-pyridylphenylacetate compounds, and the sodium-α-ethylidene-pyridylphenylacetate compounds.

EXAMPLE 18

2-[3-chloro-4-(2-pyridyl)-phenyl]-ethanol

To a well-stirred suspension of 0.005 mole of lithium aluminum hydride in 250 cc. of anhydrous ether is added dropwise a solution of 0.01 mole of 4-(2-pyridyl)-3-chlorophenylacetic acid with ice-cooling. The reaction mixture is stirred at room temperature for 1 hour, after which time 10 cc. of water is added dropwise with ice-cooling. The reaction mixture is poured into dilute sulfuric acid, made slightly alkaline with ammonia and the aqueous layer is extracted well with (2× 25 ml.) chloroform. The combined chloroform extracts are washed with water, dilute bicarbonate and water, then dried over sodium sulfate, and concentrated in vacuo. The residue is then chromatographed on a silica gel column and eluted with ether-petroleum ether (10–100%) to give 2-[3-chloro-4-(2-pyridyl)-phenyl]-ethanol.

When the pyridylphenylacetic acid compounds, the α-methyl-pyridylacetic acid compounds, the α-ethyl-pyridylacetic acid compounds, the α-methylene-pyridylphenylacetic acid compounds, and the α-ethylidene-pyridylphenylacetic acid compounds obtained from Examples 9 and 14 are used in place of 4-(2-pyridyl)-3-chlorophenylacetic acid in the above example, there are obtained the corresponding alcohols.

EXAMPLE 19

Methyl-2-[3-chloro-4-(2-pyridyl)-phenyl]-ethylether

To a well-stirred suspension of 0.01 mole of sodium hydride in 25 cc. of dry dimethylformamide which has been cooled to 0° C. is added dropwise a solution of 0.01 mole of 2-[3-chloro-4-(2-pyridyl)-phenyl]-ethanol in 10 cc. dimethylformamide. The reaction mixture is stirred for 15 minutes and 0.015 mole of methyl iodide is then added dropwise. The mixture is allowed to stand overnight at room temperature. 200 ml. of water is added and the resulting mixture extracted well with chloroform. The combined chloroform extracts are washed with water, dried over sodium sulfate, and concentrated. The residue is chromatographed on 250 grams of silica gel and eluted with ether-petroleum ether (10–80%) to yield methyl-2-[3-chloro-4-(2-pyridyl)-phenyl]-ethyl ether.

When ethyl iodide, allyl bromide, benzyl chloride, and ethoxyethyl chloride are used in place of methyl iodide in the above example, there are obtained ethyl-2-[3-chloro-4-(2-pyridyl)-phenyl]-ethyl ether, allyl-2-[3-chloro-4-(2-pyridyl)-phenyl]-ethyl ether, benzyl-2-[3-chloro-4-(2-pyridyl)-phenyl]-ethyl ether, and ethoxyethyl-2-[3-chloro-4-(2-pyridyl)-phenyl]-ethyl ether, respectively.

EXAMPLE 20

[3-chloro-4-(2-pyridyl)-phenyl]-acetaldehyde (A) [3-CHLORO-4-(2-PYRIDYL)-PHENYL]-ACETYL CHLORIDE To a solution of 0.01 mole of 4-(2-pyridyl)-3-chlorophenylacetic acid in 50 cc. of benzene is added 0.11 mole of thionyl chloride. The solution is heated on the steam-bath for 1 hour and then concentrated in vacuo to remove the solvent and any excess thionyl chloride. 25 ml. of benzene is then added and removed in vacuo to yield [3-chloro-4-(2-pyridyl)-phenyl]-acetyl chloride.

(B) [3-CHLORO-4-(2-PYRIDYL)-PHENYL]-ACETALDEHYDE

To a suspension of 0.01 mole lithium tritertiarybutoxy aluminum hydride in 50 cc. dry tetrahydrofuran is added dropwise with stirring a solution of 0.01 mole of [3-chloro-4-(2-pyridyl)-phenyl]-acetyl chloride in 25 cc. dry tetrahydrofuran. The reaction mixture is stirred at −10° C. for 3 hours, followed by the addition of 200 cc. of 5% sulfuric acid added cautiously, made slightly alkaline with ammonia and the resultant mixture extracted well with (3× 75 ml.) chloroform. The combined chloroform extracts are washed with water, dried over sodium sulfate, and concentrated. The residue is chromatographed on 250 grams of silica gel and eluted with 10–90% ether-petroleum ether to yield [3-chloro-4-(2-pyridyl)-phenyl]-acetaldehyde.

When the pyridylphenylacetic acid compounds, the α-methyl-pyridylphenylacetic acid compounds, the α-ethyl-pyridylphenylacetic acid compounds, the α-methylene-pyridylphenylacetic acid compounds, and the α-ethylidene-pyridylphenylacetic acid compounds obtained from Examples 9 and 14 are used in place of 4-(2-pyridyl)-3-chlorophenylacetic acid in Part A of the above example, and the product therefrom reacted in accordance with Part B of the above example, there are obtained the corresponding aldehydes.

EXAMPLE 21

[3-chloro-4-(2-pyridyl)-phenyl]-acetaldehyde dimethylacetal

To a solution of 0.01 mole of [3-chloro-4-(2-pyridyl)-phenyl]-acetaldheyde in 100 cc. of anhydrous methanol is added 0.001 mole of p-toluene-sulfonic acid. The reaction mixture is stirred at room temperature for 5 days. A solution of sodium methoxide in methanol is added until the solution is just alkaline to moistened litmus paper. The methanol is removed in vacuo and the residue taken up in ether and washed well with water. The ether solution is dried over sodium sulfate and concentrated. The residue is chromatographed on neutral alumina. Elution with ether-petroleum ether (10–90%) gives the dimethylacetal of [3-chloro-4-(2-pyridyl)-phenyl]-acetaldehyde.

When ethanol, n-propanol, and n-butanol are used in place of methanol in the above example, there are obtained the corresponding diethyl, dipropyl, and dibutyl acetals.

EXAMPLE 22

[3-chloro-4-(2-pyridyl)-phenyl]acetamide 0.05 mole of 4-(2-pyridyl)-3-chlorophenyl-acetic acid is slowly treated with 0.2 mole of thionyl chloride. The resultant mixture is heated gently on a steam-bath for 2 hours and the excess thionyl chloride is removed in vacuo. To this concentrated material is added 40 ml. of 1,2-dimethoxyethane and the solution is then added dropwise to 100 ml. of stirred commercial ammonium hydroxide solution (approximately 30%) with ice-cooling. The [3-chloro-4-(2-pyridyl)-phenyl]-acetamide is collected, washed with water, and dried in vacuo.

When methylamine, ethanolamine, propylamine, 2,3-dihydroxybutylamine, benzylamine, aniline, o-methoxy aniline, p-ethoxy aniline, m-trifluoromethyl aniline, cyclohexylamine, carbobenzyloxymethylamine, carboxymethylamine, gutamine, aminomethyl pyrrolidine, 3-aminomethyl-1-ethyl pyrrolidine, morpholine, piperazine, piperidine, and pyrrolidine are used in the above example in place of ammonium hydroxide, there are obtained the corresponding [3-chloro-4-(2-pyridyl)-phenyl]-substituted amides.

When the pyridylphenylacetic acid compounds, the α-methyl-pyridylphenylacetic acid compounds, the α-ethyl-pyridylphenylacetic acid compounds, the α-methylene-pyridylphenylaetic acid compounds, and the α-ethylidene-pyridylphenylacetic acid compounds obtained from Examples 9 and 14 are used in place of 4-(2-pyridyl)-3-chlorophenylacetic acid in the above example, there are obtained in the corresponding acetamide compounds.

EXAMPLE 23

[3-chloro-4-(2-pyridyl)-phenyl]-acetamide

To a solution of 0.01 mole of 4-(2-pyridyl)-3-chlorophenylacetic acid in 40 ml. of 1,2-dimethoxyethane is added 0.01 mole of triethylamine. The resulting mixture is ice-cooled, stirred, and 0.01 mole of i-butyl chloroformate is added. Stirring is then continued in the cold for an additional 30 minutes. The triethylamine hydrochloride is then removed by filtration and the filtrate cooled again. Dry dimethoxyethane saturated with dry ammonia gas is then added and the ammonia gas bubbled through the resultant mixture for approximately one minute. The mixture is then stirred at about 5° C. for 16 hours. The solvent is removed in vacuo and the residue is crystallized from ethanol-water to yield [3-chloro-4-(2-pyridyl)-phenyl]-acetamide.

When methylamine, ethanolamine, propylamine, 2,3-dihydroxybutylamine, benzylamine, aniline, o-methoxy aniline, p-ethoxy aniline, m-trifluoromethyl aniline, cyclohexylamine, carbobenzyloxymethylamine, carboxymethylamine, gutamine, aminomethyl pyrrolidine, 3-aminomethyl-1-ethyl pyrrolidine, morpholine, piperazine, piperidine, and pyrrolidine are used in the above example in place of ammonia gas, there are obtained the corresponding [3-chloro-4-(2-pyridyl)-phenyl]-substituted amides.

When the pyridiylphenylacetic acid compounds, the α-methyl-pyridylphenylacetic acid compounds, the α-ethyl-pyridylphenylacetic acid compounds, the α-methylene-pyridylphenylacetic acid compounds, and the α-ethylidene-pyridylphenylacetic acid compounds obtained from Examples 9 and 14 are used in place of 4-(2-pyridyl)-3-chlorophenylacetic acid in the above example, there are obtained the corresponding acetamide compounds.

EXAMPLE 24

Methyl-4-(2-pyridyl)-3-chlorophenylacetate

To a solution of 0.01 mole of 4-(2-pyridyl)-3-chlorophenylacetic acid in 30 ml. of anhydrous tetrahydrofuran is added 0.011 mole of methanol followed by 0.011 mole of N,N-dicyclohexylcarbodiimide (which has been dissolved in a minimum of tetrahydrofuran). The mixture is then shaken thoroughly for a minute and allowed to sit overnight stoppered. The mixture is then filtered, the precipitated N,N-dicyclohexylurea obtained is washed with a small portion of fresh tetrahydrofuran and the wash combined with the filtrate. The combined filtrates are concentrated to dryness. The residue is then taken up in 100 ml. of ether, washed with bicarbonate solution, water, dried over magnesium sulfate, filtered, and concentrated to a residue. The residue is then chromatographed on a silica gel column (wt./wt. 50:1 gram crude) using an ether-petroleum ether (v./v. 20–60%) system as eluent to yield methyl-4-(2-pyridyl)-3-chlorophenylacetate.

When ethanol, n-propanol, i-butanol, benzyl alcohol, phenylethanol, N,N, - diethylethanolamine, β-(N-morpholino)-ethanol, and N,N-dimethylethanolamine are used in place of methanol in the above example, there are obtained the ethyl, n-propyl, i-butyl, benzyl, phenylethyl, N,N-diethylaminoethyl, N-morpholino ethyl, and N,N-dimethylaminoethyl esters of 4-(2-pyridyl)-3-chlorophenylacetic acid, respectively. The esters from the N-substituted ethanolamines are extracted from the ether solution indicated in the above example, using dilute hydrochloric acid, the acid solution washed well with ether, made slightly alkaline with ammonium hydroxide, extracted with ether, the combined ether extracts washed with water, dried over potassium carbonate and charcoal, filtered, and the resulting ether solution concentrated to a residue. The volatile ethanolamines are then removed in vacuo.

Similarly, when the pyridylphenylacetic acid compounds, the α-methyl-pyridylphenylacetic acid compounds, the α-ethyl-pyridylphenylacetic acid compounds, and the α-methylene-pyridylphenylacetic acid compounds, and the α-ethylidene-pyridylphenylacetic acid compounds obtained from Examples 9 and 14 are used in place of 4-(2-pyridyl)-3-chlorophenylacetic acid in the above example, there are obtained the corresponding methyl; and when the alcohols previously described are used in place of methanol in the above example, along with the other heterocyclic compounds indicated above, there are obtained the corresponding ethyl, n-propyl, i-butyl, benzyl, phenylethyl, N,N-diethylaminoethyl, N-morpholinoethyl and N,N-dimethylamino ethyl esters.

We claim:

1. A compound of the group consisting of compounds of the general formula:

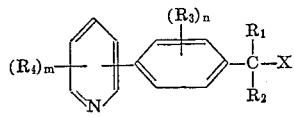

wherein
  $R_1$ is selected from the group consisting of hydrogen, lower alkyl, lower alkenyl, lower alkynyl;
  $R_2$ is selected from the group consisting of hydrogen and lower alkyl; and when $R_1$ and $R_2$ are taken together, form a group selected from the group consisting of methylene, ethylidene, and together with the α-carbon a cyclopropyl group;
  $n$ and $m$ are 0 or 1;
  $R_3$ and $R_4$ are each selected from the group consisting of hydrogen, lower alkyl, halogen, trihalomethyl, lower alkylthio, cyano, nitro, lower alkoxy, and
  X is selected from the group consisting of COOH; COOR‴, where R‴ is selected from the group consisting of lower alkyl, benzyl, phenethyl, phenyl, lower alkoxy lower alkyl and di(lower alkyl)amino lower alkyl;

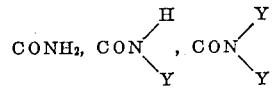

wherein Y is selected from the group consisting of lower alkyl, hydroxy lower alkyl, dihydroxy lower alkyl, phenyl lower alkyl, phenyl, lower alkoxyphenyl, halogenophenyl, trifluoromethylphenyl, cyclohexyl, N-lower alkyl pyrrolidyl, N-lower alkyl pyrrolidyl lower alkyl, and Y forms a heterocyclic group with the nitrogen when Y is selected from the group consisting of —$CH_2$—$CH_2$—O—$CH_2$—$CH_2$—

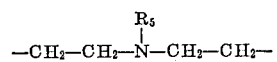

wherein $R_5$ is lower alkyl,

—$CH_2$—$CH_2$—NH—$CH_2$—$CH_2$—

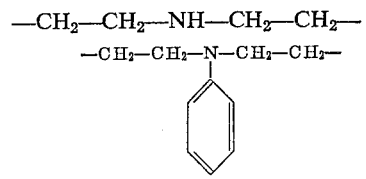

—$CH_2$—$CH_2$—$CH_2$—$CH_2$— and

—$CH_2$—$CH_2$—$CH_2$—$CH_2$—$CH_2$—

$CH_2OH$; $CH_2OR_6$ wherein $R_6$ is alkyl; CHO; $CH(OR_7)_2$ wherein $R_7$ is lower alkyl, and the pharmaceutically non-toxic salts of the acid.

2. A compound of claim 1 wherein
X is COOH;
$R_1$ and $R_2$ are each hydrogen;
$n$ is one;
$m$ is 0; and
$R_3$ is halogen.

3. A compound of claim 1 wherein
X is COOH;
$R_1$ is lower alkyl;
$R_2$ is hydrogen;
$n$ is one;
$m$ is 0; and
$R_3$ is halogen.

4. A compound of claim 1 wherein
X is COOH;
$R_1$ and $R_2$ taken together is methylene;
$n$ is one;
$m$ is 0; and
$R_3$ is halogen.

References Cited

UNITED STATES PATENTS 3,247,222  2/1966  Lunsford _____ 260—326.3

HENRY R. JILES, *Primary Examiner*.

ALAN L. ROTMAN, *Assistant Examiner*.

U.S. Cl. X.R.

260—247.5, 268, 290, 294.7, 294.8, 294.9, 295, 295.5, 296, 297, 999